(12) United States Patent
Yang (10) Patent No.: US 10,353,614 B2
(45) Date of Patent: Jul. 16, 2019

(54) RAID SYSTEM AND METHOD BASED ON SOLID-STATE STORAGE MEDIUM

(71) Applicant: Shannon Systems Ltd., Shanghai (CN)

(72) Inventor: Xueshi Yang, Cupertino, CA (US)

(73) Assignee: SHANNON SYSTEMS LTD., Shanghai (CN)

( * ) Notice: Subject to any disclaimer, the term of this patent is extended or adjusted under 35 U.S.C. 154(b) by 0 days.

(21) Appl. No.: 15/527,781

(22) PCT Filed: Dec. 31, 2014

(86) PCT No.: PCT/CN2014/095876
§ 371 (c)(1),
(2) Date: May 18, 2017

(87) PCT Pub. No.: WO2016/078193
PCT Pub. Date: May 26, 2016

(65) Prior Publication Data
US 2017/0329522 A1    Nov. 16, 2017

(30) Foreign Application Priority Data

Nov. 20, 2014   (CN) .......................... 2014 1 0668008

(51) Int. Cl.
*G06F 12/10* (2016.01)
*G06F 3/06* (2006.01)
(Continued)

(52) U.S. Cl.
CPC ............ *G06F 3/064* (2013.01); *G06F 3/0616* (2013.01); *G06F 3/0688* (2013.01);
(Continued)

(58) Field of Classification Search
CPC ................................. G06F 3/064; G06F 12/06
(Continued)

(56) References Cited

U.S. PATENT DOCUMENTS

| 5,524,204 A | 6/1996 | Verdoom, Jr. |
| 9,176,817 B2 | 11/2015 | Cideciyan et al. |

(Continued)

FOREIGN PATENT DOCUMENTS

| CN | 102656567 A | 9/2012 |
| CN | 102915212 A | 2/2013 |

(Continued)

OTHER PUBLICATIONS

International Search Report dated May 9, 2017, issued in application No. PCT/CN2014/095876.

*Primary Examiner* — Jae U Yu
(74) *Attorney, Agent, or Firm* — McClure, Qualey & Rodack, LLP (57) ABSTRACT

A RAID system and method based on a solid-state storage medium. The system includes a plurality of solid-state storage devices and a main control unit. Each solid-state storage device includes a solid-state storage medium and a controller for controlling reading and writing of the solid-state storage medium. The main control unit is electrically connected to the controller of each of the solid-state storage devices in a RAID array. The main control unit is used for performing address mapping from a logical block address in the RAID array to a physical block address of the flash memory solid-state storage device. The address mapping and the RAID function can be integrated to solve the problems of write amplification and low performance. The unified management of address mapping of the solid-state storage devices can be implemented to improve the efficiency of garbage collection and wear leveling of the solid-state storage system.

9 Claims, 6 Drawing Sheets

(51) Int. Cl.
*G06F 12/02* (2006.01)
*G06F 12/06* (2006.01)
*G06F 11/10* (2006.01)

(52) U.S. Cl.
CPC ...... *G06F 11/1076* (2013.01); *G06F 12/0253* (2013.01); *G06F 12/06* (2013.01); *G06F 2212/1036* (2013.01); *G06F 2212/2022* (2013.01); *G06F 2212/2024* (2013.01); *G06F 2212/262* (2013.01); *G06F 2212/7201* (2013.01); *G06F 2212/7205* (2013.01)

(58) Field of Classification Search
USPC .......................................................... 711/114
See application file for complete search history.

(56) References Cited

U.S. PATENT DOCUMENTS

| | | | |
|---|---|---|---|
| 2010/0125695 A1* | 5/2010 | Wu | G06F 3/0613 |
| | | | 711/103 |
| 2015/0242124 A1* | 8/2015 | Law | G06F 3/0688 |
| | | | 711/103 |

FOREIGN PATENT DOCUMENTS

| | | | |
|---|---|---|---|
| CN | 103019882 A | 4/2013 |
| CN | 103049222 A | 4/2013 |
| CN | 103176858 A | 6/2013 |

* cited by examiner

RAID SYSTEM AND METHOD BASED ON SOLID-STATE STORAGE MEDIUM

FIELD OF THE INVENTION

The present invention relates to data storage devices, and in particular, to a redundant array of independent disks (RAID) system and method based on a solid-state storage medium.

DESCRIPTION OF THE RELATED ART

Technologies of redundant array of independent disks (RAID) are widely used in data storage applications. The redundancy of data and storage devices are used in the RAID technologies to prevent data loss caused by the malfunctioning of any disk or storage device in the system. Various RAID architectures have been developed, such as RAID-1, RAID-2, RAID-3, RAID-4, RAID-5, and RAID-6, based on different requirements of data protection. The following description, for example, is based on RAID-5. It should be noted that the technique can be used in other RAID configurations such as RAID-6 or RAID-10.

In a conventional RAID system, fixed logical mapping is used. That is, a given logical block address (LBA) corresponds to a fixed storage device, and the fixed mapping relationship does not change when the data in the storage devices is updated or new data are written into the storage devices in the conventional RAID system.

There are some serious deficiencies in conventional RAID technologies. For example, compared with writing data into multiple storage devices in parallel, significant performance loss is caused by random data writing, especially when the base storage devices of the RAID system are solid-state storage devices. There are several reasons for the performance loss, such as:

1. Write amplification (WA) of parity bits can be caused by random data writing: parity bits are updated by each randomly written data block, resulting in the actual amount of data physically written into the storage devices being a multiple of the logical amount intended to be written in a random data writing operation. However, a solid-state storage device, especially a flash memory storage device, has a limited number of writes.

2. Write amplification is also induced by each data block written to a single solid-state storage device, resulting in a write amplification factor greater than 2.

3. Performance loss is caused by redundant operations such as reading and writing parity bits during random data writing.

4. When the amount of to-be-written data is smaller than a RAID stripe, a "write hole" problem can be caused by incorrect information, i.e., parity bits of the RAID stripe due to a sudden power loss or system crash.

BRIEF SUMMARY OF THE INVENTION

In view of the above-mentioned disadvantages with existing technologies, a RAID system and method based on a solid-state storage medium are provided in the invention to solve the problem of low performance of the conventional RAID system based on a solid-state storage medium.

In an exemplary embodiment, a redundant array of independent disks (RAID) system based on a solid-state storage medium is provided, comprising a plurality of solid-state storage devices and a main control unit. Each solid-state storage device comprises a solid-state storage medium and a controller for controlling the solid-state storage medium. The main control unit is electrically connected to the controller of each solid-state storage device. The main control unit is configured to form a RAID array with the solid-state storage devices and perform address mapping from logical block addresses (LBA) in the RAID array to physical block addresses (PBA) in each solid-state storage device.

Preferably, the address mapping from logical block addresses to physical block addresses is dynamically changed, and each RAID stripe in the RAID array is updated according to the dynamic change of the address mapping.

Preferably, parity data are stored in each RAID stripe, and the parity data are polled between each solid-state storage device in the RAID array with the updating of the RAID stripes.

Preferably, PBA information is used in the communication between the main control unit and the controller of each solid-state storage device.

Preferably, the main control unit performs garbage collection and wear leveling of each solid-state storage device in the RAID array.

Preferably, the main control unit controls garbage collection and wear leveling of each solid-state storage device in the RAID array.

In another exemplary embodiment, a redundant array of independent disks (RAID) method based on a solid-state storage medium is provided. The method includes the steps of: providing a plurality of solid-state storage devices, each solid-state storage device comprising a solid-state storage medium and a controller for controlling the solid-state storage medium; and providing a main control unit electrically connected to the controller of each solid-state storage device, and utilizing the main control unit to form a RAID array with each solid-state storage device and map logical block addresses in the RAID array to physical block addresses in each solid-state storage device.

Preferably, the address mapping from logical block addresses to physical block addresses is dynamically changed, and each RAID stripe in the RAID array is updated according to the dynamic change of the address mapping.

Preferably, parity data are stored in each RAID stripe, and the parity data are polled between each solid-state storage device in the RAID array with the updating of the RAID stripes.

Preferably, PBA information is used in the communication between the main control unit and the controller of each solid-state storage device.

Preferably, the main control unit performs garbage collection and wear leveling of each solid-state storage device in the RAID array.

Preferably, the main control unit controls garbage collection and wear leveling of each solid-state storage device in the RAID array.

In view of the above, a RAID system and method based on solid-state storage medium are provided in the invention. The RAID system includes: a plurality of solid-state storage devices, wherein each solid-state storage device includes: a solid-state storage medium and a controller for controlling the solid-state storage medium; a main control unit, electrically connected to the controller of each solid-state storage device, and configured to form a RAID array with the solid-state storage devices and perform address mapping from logical block addresses of the RAID array to physical block addresses of each solid-state storage device. In the invention, the address mapping and the RAID function can be integrated to solve the problems of write amplification and low performance, and the unified management of address mapping of the solid-state storage devices can be implemented to improve the efficiency of garbage collection and wear leveling of the solid-state storage system.

BRIEF DESCRIPTION OF THE DRAWINGS

The present invention can be more fully understood by reading the subsequent detailed description and examples with references made to the accompanying drawings, wherein.

BRIEF DESCRIPTION OF THE SYMBOLS

1 RAID system based on a solid-state storage medium
11 solid-state storage device
111 controller
112 solid-state storage medium
12 main control unit
S1~S2 method steps

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
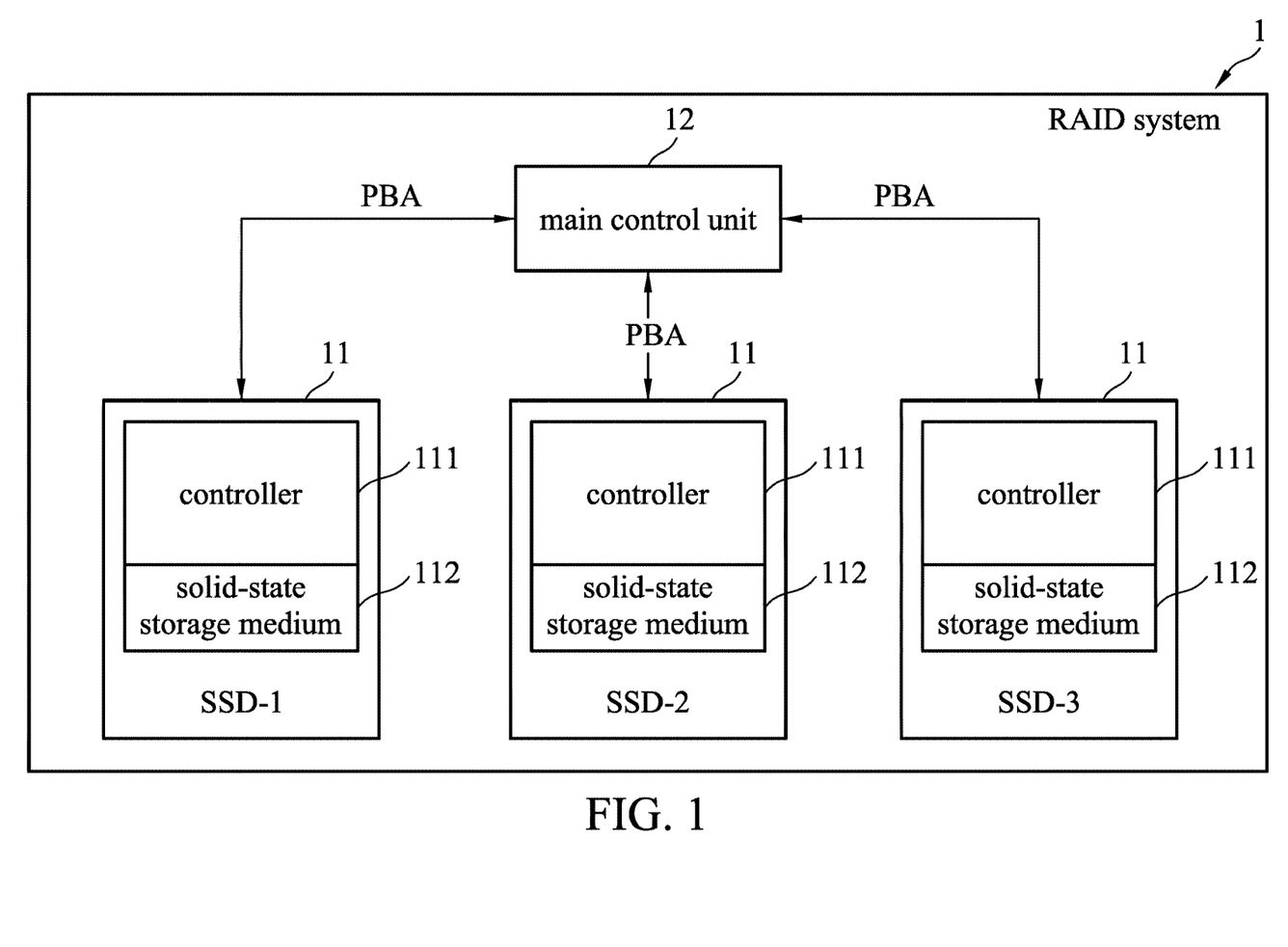
FIG. 1 is a block diagram of a RAID system based on a solid-state storage medium in accordance with an embodiment of the invention.

As shown in FIG. 1, an exemplary RAID system based on solid-state storage mediums 112 is provided, and the RAID system 1 includes a plurality of solid-state storage devices 11 and a main control unit 12.

Each of the solid-state storage devices 11 includes a solid-state storage medium 112 and a controller 111 for controlling reading and writing of the solid-state storage medium 112. In an embodiment, the solid-state storage device 11 may be, for example, a flash memory such as a NAND flash memory or non-volatile solid-state storage medium solid-state drives (SSD). The non-volatile solid-state storage medium includes a phase change memory (PCM), or a magnetic random access memory (MRAM). The controller 111 includes a control chip of the solid-state storage device 11 that is configured to control the reading and writing functions of the solid-state storage device 11. It should be understood that the address mapping function for mapping original logical block addresses (LBA) to physical block addresses (PBA) in each controller 111 is separated and integrated into the RAID mechanism, and the details will be described later.

The main control unit 12 is electrically connected to the controller 111 of each solid-state storage device 11, and is configured to form the solid-state storage devices 11 into a RAID array and mapping logical block addresses in the RAID array to physical block addresses in each solid-state storage device 11. In an embodiment, the solid-state storage medium 112 is a flash memory, and the main control unit 12 includes an FTL and a RAID mechanism, wherein FTL is an abbreviation of a "flash translation layer" which is a software intermediate layer proposed by Intel for protecting the flash memory to achieve wear leveling to increase the lifetime of the flash memory. The term RAID denotes redundant arrays of independent disks, and the RAID can be implemented by multiple arrays of disk sets with distributed data arrangement to improve the safety of data. The RAID is a disk set having a huge data capacity using many inexpensive disks, and data provided from each disk can be integrated to improve the system performance of the whole RAID. Using the RAID technology, data can be divided into many segments that are stored in each disk separately. In addition, a parity check function can be used in the RAID, and data can still be retrieved from the RAID even if any one of the RAID malfunctions. The data can be recalculated and re-stored in the new disk during data reconstruction.

In conventional RAID architecture, SSD are independent storage units, and the RAID mechanism is above the SSDs and is independent from the FTLs of the SSDs. The FTLs in the SSDs are for dynamically mapping logical block addresses to physical block addresses. The LBA segment for each SSD in the RAID system is fixed; that is, the LBA segment for each SSD in the conventional RAID system is static, i.e. static mapping. However, LBAs are the information being communicated between the RAID and SSDs.

In the invention, the address mapping function in each solid-state storage device 11 is separated and is integrated into the RAID, so that PBAs, instead of LBAs, are used in the communication between the main control unit 12 and the control 111 of each solid-state storage device 11. SSDs in the proposed architecture only perform read and write operations according to physical block addresses and do not need to perform mapping from LBAs to PBAs and wear leveling, thereby significantly reducing the burden on the controller 111 in each solid-state storage device 11 and increasing the lifetime.

Referring to FIGS. 2A-2D, the principles and advantages of the improved RAID architecture in the invention are described with the following embodiment:

In the embodiment, a cross-drive RAID architecture based on flash memory SSDs is described. The FTL is separated from each SSD, and FTLs of the SSDs are integrated into a relatively independent function layer, and an embedded RAID mechanism can be implemented in the FTLs. The differences between the existing technology and proposed RAID architecture are that: PBAs are used in the communication between the RAID and SSDs rather than LBAs in the conventional architecture; FTLs of the SSDs are integrated into a unified FTL. PBAs are used in the communication between the FTL and SSDs, so that SSDs only perform read and write operations according to the PBAs without performing the functions such as mapping LBAs to PBAs and wear leveling; A RAID mechanism is embedded into the FTL to implement a redundant disk mechanism between the SSDs; the LBAs corresponding to each SSD are dynamically changed according to the data to be written, thereby implementing dynamic mapping.

In the embodiment, three solid-state storage devices 11 are used in the RAID array, such as SSD-1, SSD-2, and SSD-3 shown in FIGS. 2A-2D, but the number of SSDs is exemplary, and is not intended to limit the invention. Each row in the RAID array represents a "stripe", and each block in FIGS. 2A-2D represents a PBA, and the numeral in each block represents the LBA. In the embodiment, the solid-state storage device SSD-3 stores parity bits for error checking in the RAID array.

Figure 2A:
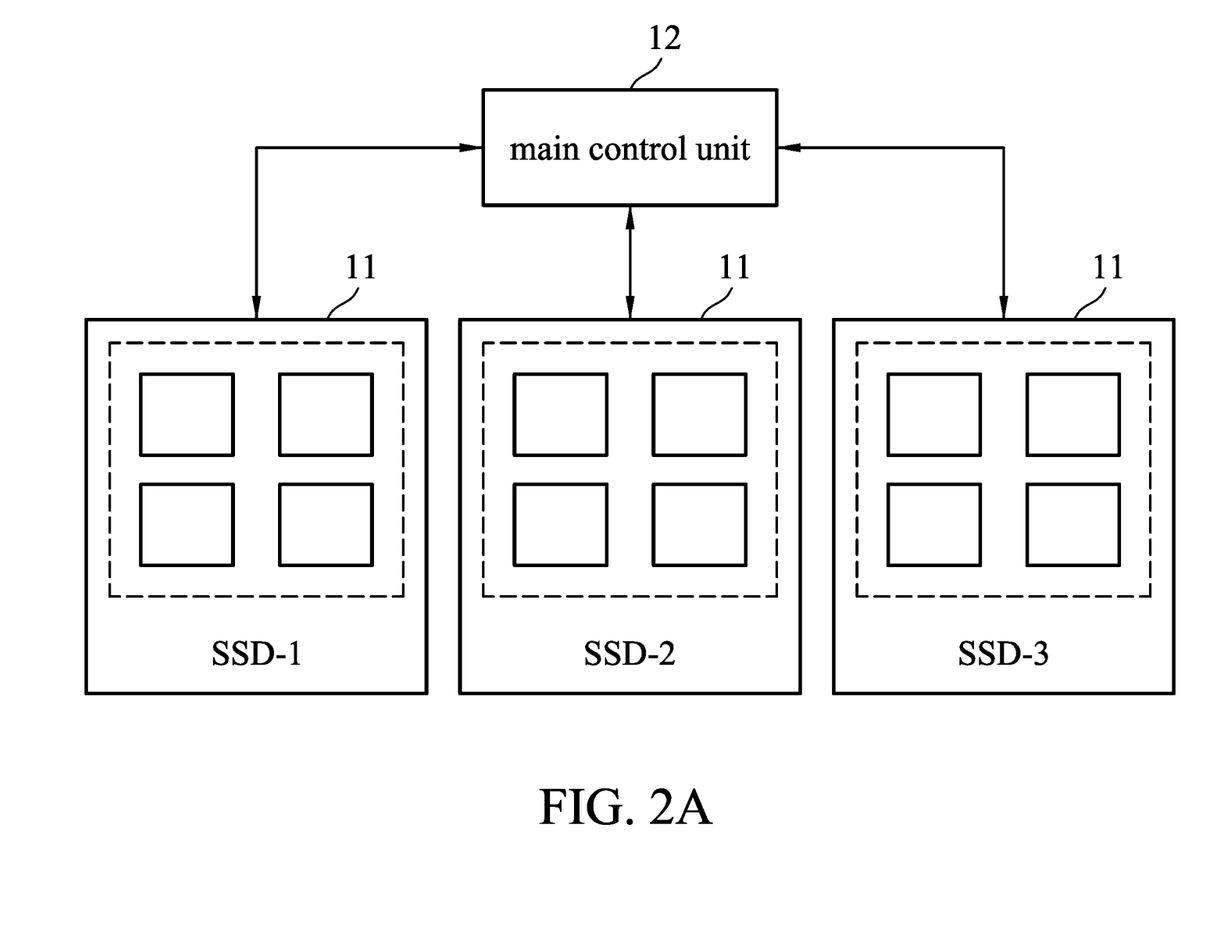
FIGS. 2A-2D are diagrams of a scenario of the RAID system based on a solid-state storage medium in accordance with an embodiment of the invention.
Figure 2B:
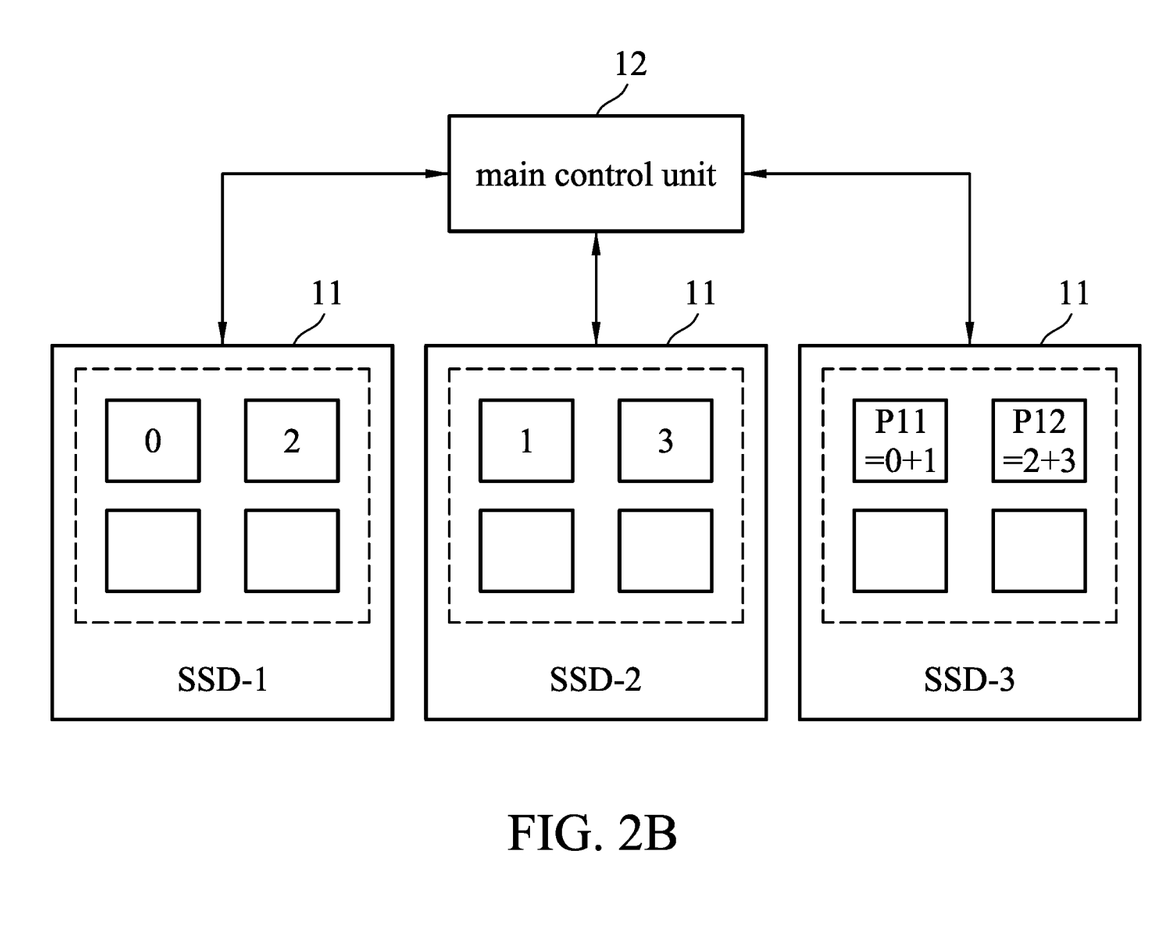
Figure 2C:
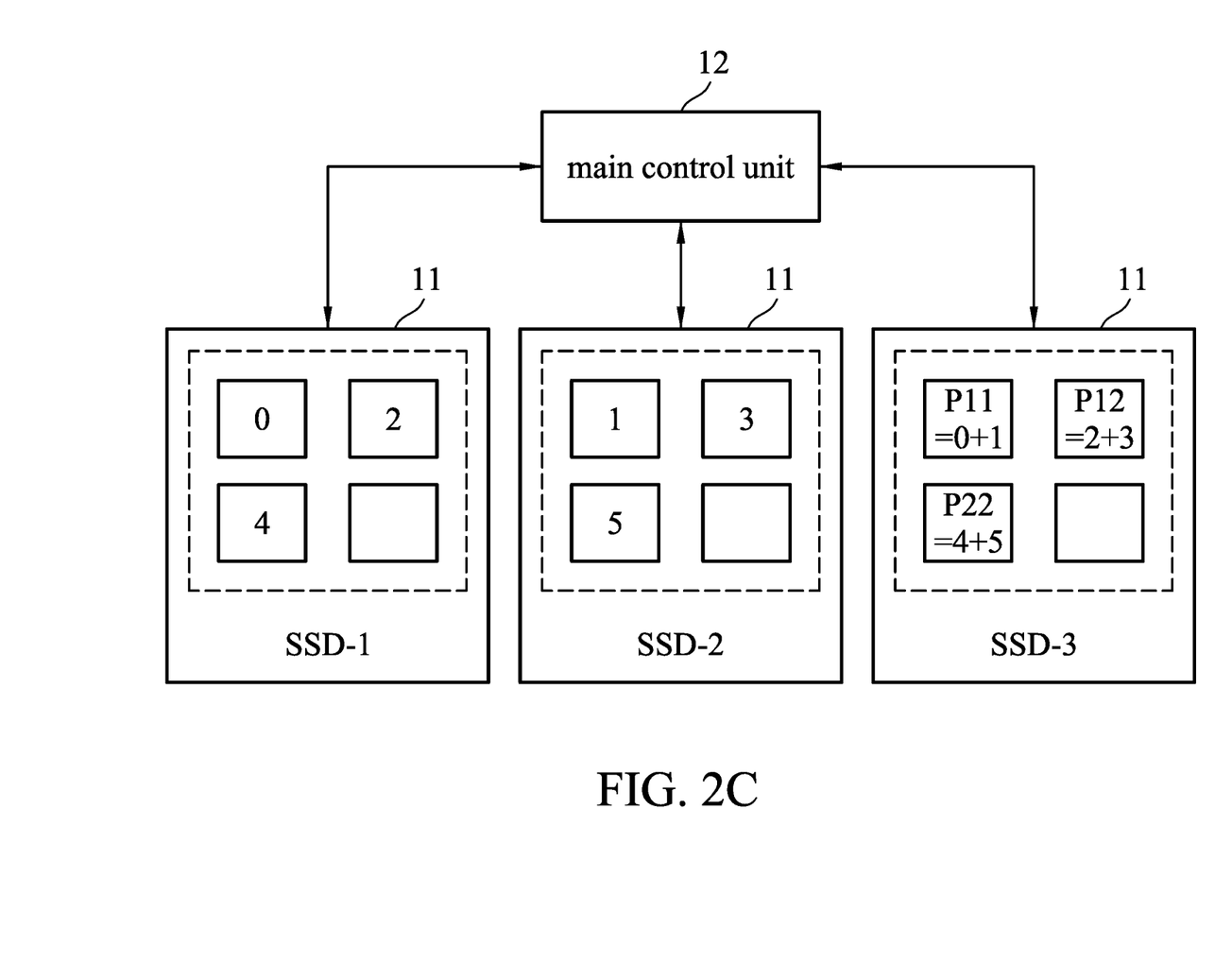
Figure 2D:
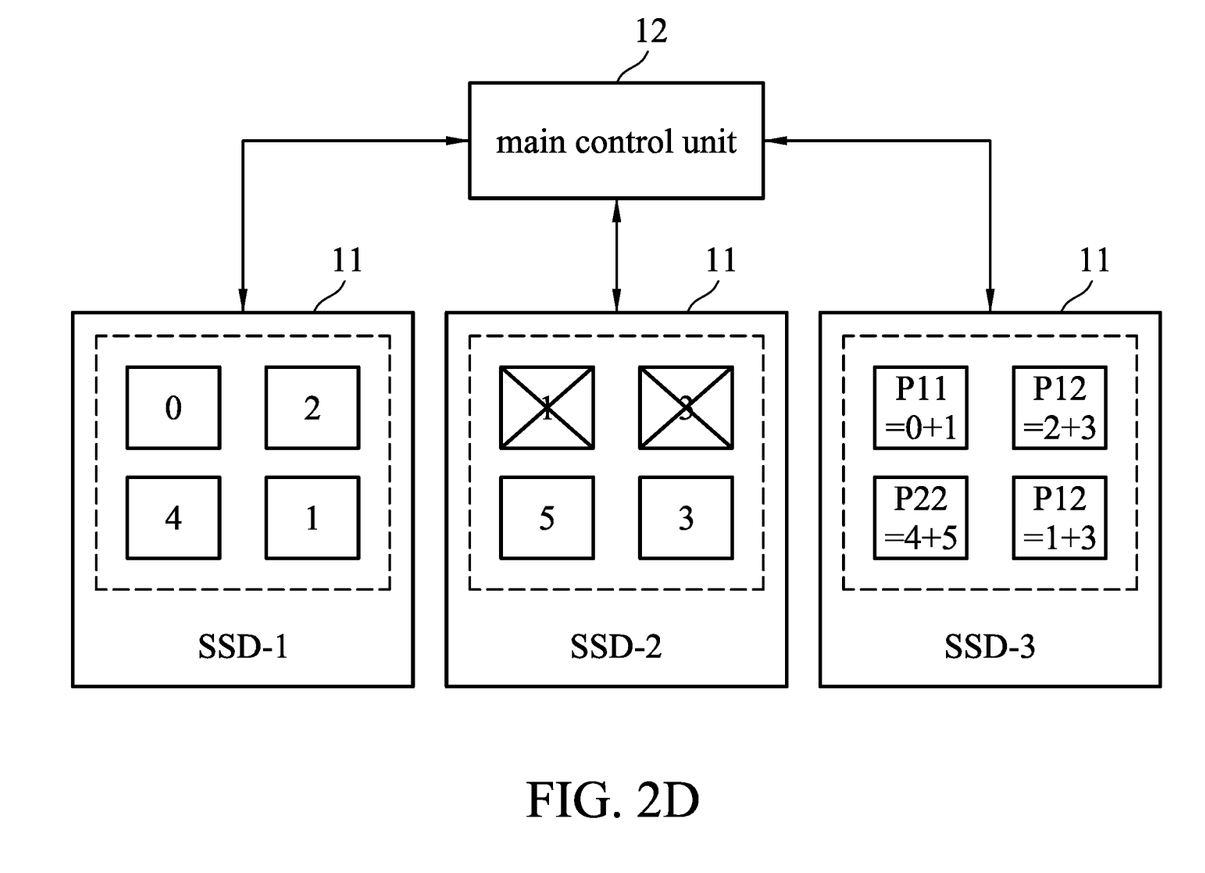

As shown in FIG. 2A, initial states of the three SSDs are illustrated, and all blocks are empty. Referring to FIG. 2B, the first stripe of the RAID array is written into LBA0, LBA1, LBA2, and LBA3. Referring to FIG. 2C, the second stripe is written into LBA4 and LBA5. Referring to FIG. 2D, the results after updating data in LBA1 and LBA3 are illustrated.

In view of the aforementioned procedure, the address mapping from LBAs to PBAs is dynamically changed. LBA1 is stored in the solid-state storage device SSD-2 before data updating, and LBA1 is stored in the solid-state storage device SSD-1 after data updating. Each stripe in the RAID array is updated according to dynamic address mapping. LBA2 and LBA3 belongs to the same RAID stripe before data updating, but the LBA2 still belongs to the original RAID stripe (i.e. with outdated LBA3 data) after data updating, and the parity of LBA2 corresponds to the parity data block P12. LBA1 and LBA3 form a new RAID stripe after data updating, and the parity of LBA1 and LBA3 corresponds to the parity data block P22.

Accordingly, as described above, the parity bit is not read or written during the data updating procedure. When data is updated, the data is written into a new PBA that may form a new RAID stripe with other LBAs. The effect of the proposed RAID architecture may directly reduce the write amplification factor of random data writing lower than 2. It is not necessary to write a parity data block while random writing data into an LBA, and one parity data block may be performed after writing data into multiple LBAs.

Preferably, the parity reading can be omitted in the RAID system 1, thereby reducing redundant data writing of the RAID system 1. The RAID system 1 may also maintain the data redundancy mechanism of a conventional RAID system, as shown in the example of RAID-5 configuration, and safe data recovery can be guaranteed when one SSD in the RAID system 1 malfunctions.

Preferably, the proposed RAID system may also solve the "write hole" problem for the existing RAIDS or other RAID configurations. When a sudden power loss occurs, some parity data calculated by the SSD for storing the parity data will be written into an intermediate storage medium that is provided by the sudden power loss protection mechanism of the SSD. When the RAID system recovers from the sudden power loss, the PBA having no written data will be determined as an empty page, and the parity data to be written is a portion of parity data of the written data.

It should be noted that the main control unit 12 can be implemented by software executed on a computer, or implemented by a dedicated processor (e.g. MCU or CPU).

Preferably, the parity calculation can be implemented by software of the FTL or implemented by hardware of the controller in the SSD. When the parity calculation is implemented by hardware, the data written into other SSDs may also be written into the SSD for storing parity data. After all data in the current RAID stripe is input, the calculation for parity data is also completed, and the calculated parity data are written into the intermediate flash memory. The SSD for storing the parity data is dynamically operated; that is, the SSD for storing the parity data performs polling between the SSDs upon data being written into the SSDs.

An FTL functional module can be shared by multiple SSDs by separating FTLs from the SSDs. Meanwhile, in order to provide the error tolerance mechanism in the conventional RAID system, the RAID function is integrated into the FTL of the invention, thereby solving the problems of write amplification and low performance of the conventional RAID system. In addition, the FTLs of the SSDs are integrated into a unified FTL invention that may improve the efficiency of garbage collection and wear leveling for conventional SSDs. Thus, the performance of the solid-state storage system in the conventional RAID architecture can be significantly increased, and the system cost can be significantly reduced, and the lifetime and reliability of the RAID system can be maximized.

Figure 3:
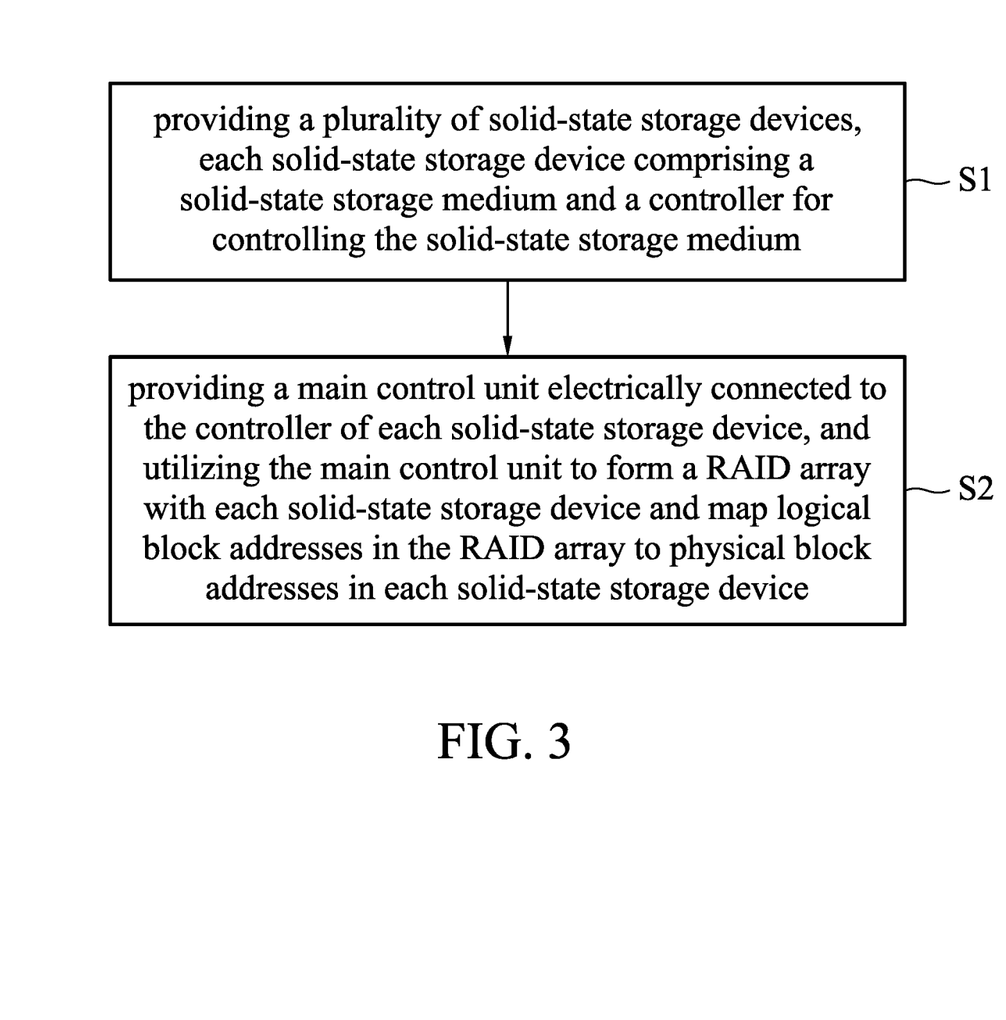
FIG. 3 is a flow chart of a RAID method based on a solid-state storage medium in accordance with an embodiment of the invention.

As shown in FIG. 3, using the technologies in the RAID system 1, a RAID method based on solid-state storage mediums is provided in the invention, the method includes the steps of:

Step S1: providing a plurality of solid-state storage devices, wherein each solid-state storage device includes: a solid-state storage medium and a controller for controlling the solid-state storage medium;

Step S2: providing a main control unit electrically connected to the controller of each solid-state storage device, and utilizing the main control unit to form a RAID array with each solid-state storage device and map logical block addresses in the RAID array to physical block addresses in each solid-state storage device.

Specifically, if the flash memory storage medium is a NAND flash memory, the FTLs can be separated from the SSDs in the RAID array that is formed by solid-state storage devices having flash memories. The FTLs of the SSDs can be integrated into a relatively independent functional layer, and the embedded RAID mechanism can be implemented in the functional layer of the FTLs. The differences between the existing technology and proposed RAID architecture are that: PBAs are used in the communication between the RAID and SSDs rather than LBAs in the conventional architecture; FTLs of the SSDs are integrated into a unified FTL. PBAs are used in the communication between the FTL and SSDs, so that SSDs only perform read and write operations according to the PBAs without performing the functions such as mapping LBAs to PBAs and wear leveling; A RAID mechanism is embedded into the FTL to implement a redundant disk mechanism between the SSDs; the LBAs corresponding to each SSD are dynamically changed according to the data to be written, thereby implementing dynamic mapping.

In an embodiment, the address mapping from logical block addresses to physical block addresses is dynamically changed, and each RAID stripe in the RAID array is updated according to the dynamic change of the address mapping.

In an embodiment, parity data are stored in each RAID stripe, and the parity data are polled between each solid-state storage device in the RAID array with the updating of the RAID stripes.

In an embodiment, PBA information is used in the communication between the main control unit and the controller of each solid-state storage device.

In an embodiment, the main control unit controls garbage collection and wear leveling of each solid-state storage device in the RAID array.

In view of the above, a RAID system and method based on solid-state storage medium are provided in the invention. The RAID system includes: a plurality of solid-state storage devices, wherein each solid-state storage device includes: a solid-state storage medium and a controller for controlling the solid-state storage medium; a main control unit, electrically connected to the controller of each solid-state storage device, and configured to form a RAID array with the solid-state storage devices and perform address mapping from logical block addresses of the RAID array to physical block addresses of each solid-state storage device. In the invention, the address mapping and the RAID function can be integrated to solve the problems of write amplification and low performance, and the unified management of address mapping of the solid-state storage devices can be implemented to improve the efficiency of garbage collection and wear leveling of the solid-state storage system.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A redundant array of independent disks (RAID) system based on a solid-state storage medium, comprising:
    a plurality of solid-state storage devices, each solid-state storage device comprising: a solid-state storage medium and a controller for controlling the solid-state storage medium;
    a main control unit, electrically connected to the controller of each solid-state storage device, and configured to form a RAID array with the solid-state storage devices and perform address mapping from logical block addresses (LBA) in the RAID array to physical block addresses (PBA) in each solid-state storage device,
    wherein the address mapping from the logical block addresses to the physical block addresses is dynamically changed, and each RAID stripe in the RAID array is updated according to dynamic change of the address mapping,
    wherein parity data for each RAID stripe in the RAID array is not read or written during updating data of each RAID stripe in the RAID array.

2. The RAID system as claimed in claim 1, wherein the parity data are stored in each RAID stripe, the parity data are polled between each solid-state storage device in the RAID array with an updating of the RAID stripes.

3. The RAID system as claimed in claim 1, wherein PBA information is used in the communication between the main control unit and the controller of each solid-state storage device.

4. The RAID system as claimed in claim 1, wherein the solid-state storage medium comprises a flash memory solid-state storage medium or a non-volatile solid-state storage medium, and the flash solid-state storage medium comprises a NAND flash memory, and the non-volatile storage medium comprises a phase change memory (PCM) or a magnetic random access memory (MRAM).

5. The RAID system as claimed in claim 1, wherein the main control unit controls garbage collection and wear leveling of each solid-state storage device in the RAID array.

6. A redundant array of independent disks (RAID) method based on a solid-state storage medium, comprising:
    providing a plurality of solid-state storage devices, each solid-state storage device comprising a solid-state storage medium and a controller for controlling the solid-state storage medium; and
    providing a main control unit electrically connected to the controller of each solid-state storage device, and utilizing the main control unit to form a RAID array with each solid-state storage device and map logical block addresses in the RAID array to physical block addresses in each solid-state storage device,
    wherein the address mapping from the logical block addresses to the physical block addresses is dynamically changed, and each RAID stripe in the RAID array is updated according to dynamic change of the address mapping,
    wherein parity data for each RAID stripe in the RAID array is not read or written during updating data of each RAID stripe in the RAID array.

7. The method as claimed in claim 6, wherein the parity data are stored in each RAID stripe, and the parity data are polled between each solid-state storage device in the RAID array with the updating of the RAID stripes.

8. The method as claimed in claim 6, wherein PBA information is used in the communication between the main control unit and the controller of each solid-state storage device.

9. The method as claimed in claim 6, wherein the main control unit controls garbage collection and wear leveling of each solid-state storage device in the RAID array.

* * * * *